May 18, 1937.  G. C. MILLER  2,081,093
METHOD OF PACKING A PREDETERMINED CANDY MIXTURE
Original Filed April 26, 1933  2 Sheets-Sheet 1
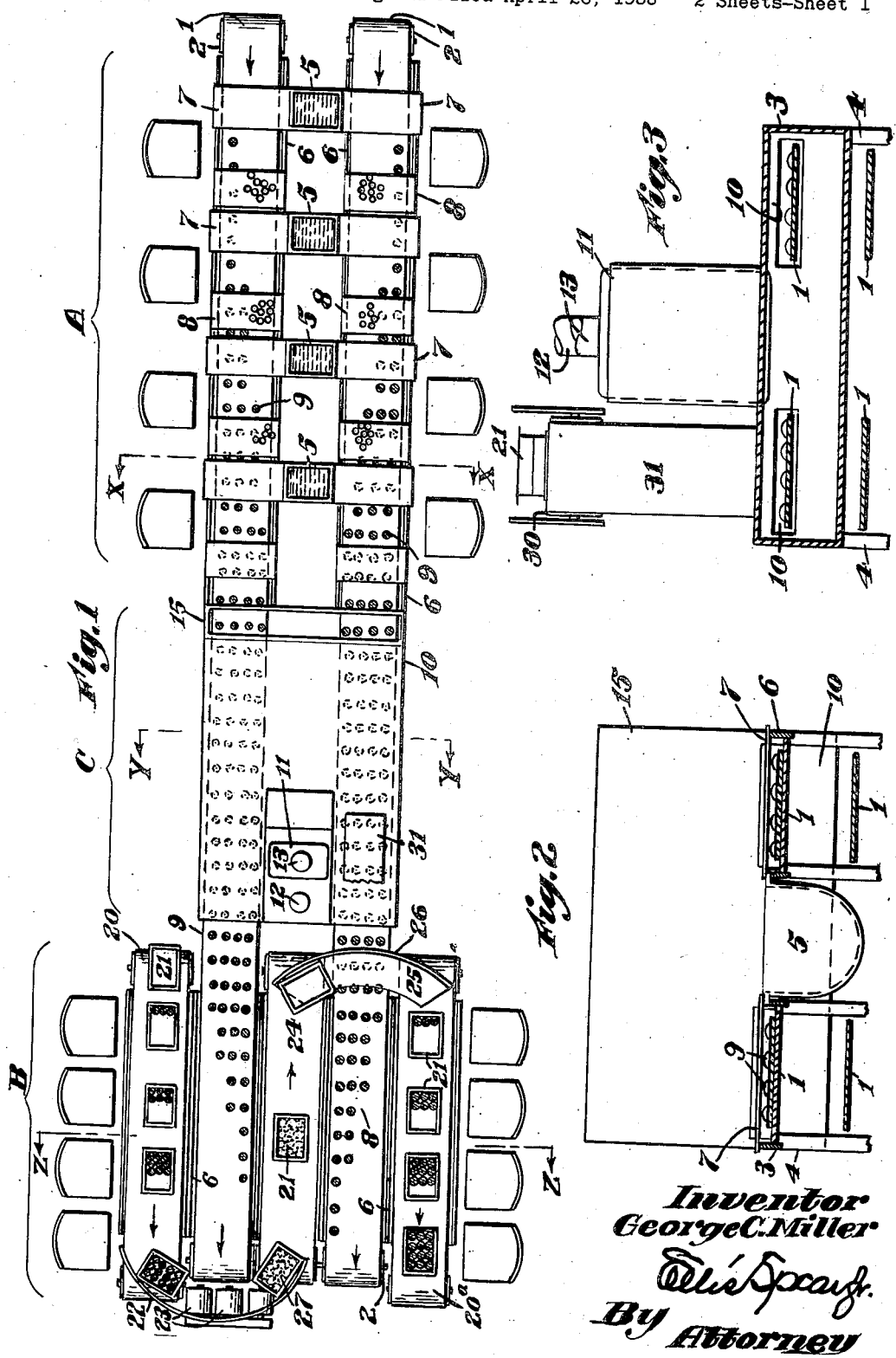
Inventor
George C. Miller
By Attorney May 18, 1937.  G. C. MILLER  2,081,093
METHOD OF PACKING A PREDETERMINED CANDY MIXTURE
Original Filed April 26, 1933  2 Sheets-Sheet 2
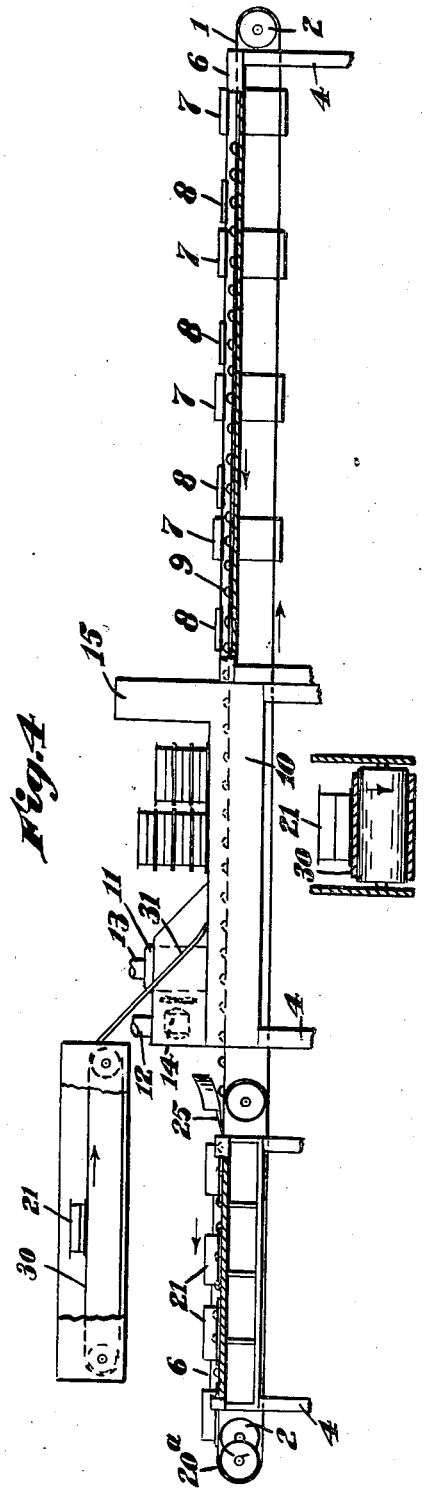
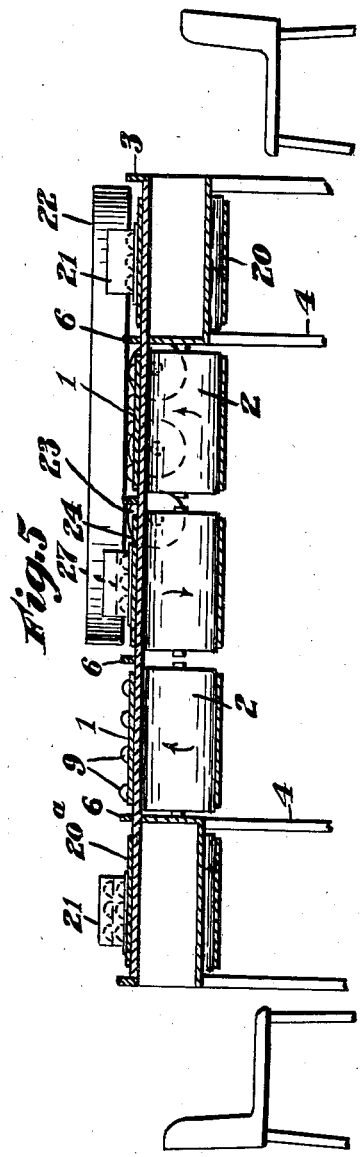
Inventor
George C. Miller
By Attorney Patented May 18, 1937

2,081,093

UNITED STATES PATENT OFFICE 2,081,093

METHOD OF PACKING A PREDETERMINED CANDY MIXTURE

George C. Miller, Brighton, Mass., assignor to Excelsior Machine Corporation, a corporation of Massachusetts Original application April 26, 1933, Serial No. 668,085. Divided and this application February 12, 1935, Serial No. 6,264

15 Claims. (Cl. 226—2)

In the production of packaged assortments of chocolates or like dipped centers or other predetermined mixtures of candy or the like, it is of great importance to maintain the standard assortment in kind and number.

This is particularly true of packs of such mixtures, as for example, boxed chocolate mixtures, bon-bons, fruit or nut specialties.

In such mixtures, which are usually piece named or trade-marked, the particular pack is bought sealed, usually in reliance upon the presence, or absence of certain items in the discrimination of the purchaser.

"Quick sales", "week end" or "holiday" packages, particularly afford a problem because they usually have to be produced at a low price. The expense of the assured or guaranteed assorted mixture package involves considerable factors of counting, sorting, handling and with all the necessity of assured result.

From the urgent need of making possible to manufacturer and to consuming public such pack mixtures with a maximum of certainty of standard and a minimum of cost, the present concept sprang.

Essentially, this concept is one of method, although in its development there are important though fortunately simple mechanical combinations involved. While these may be and in most cases must be varied to suit the resources and facilities of the individual manufacturer, the accompanying drawings illustrate a characteristic device for the production of such unit packs in accordance with this invention. This application is a division of applicant's original application Serial No. 668,085, filed April 26, 1933, and represents a continuation of the method aspects of that case.

Throughout the specification and drawings, like reference characters indicate corresponding parts, and in the drawings:

Fig. 1 is a diagrammatic view of a machine presenting the essentials of the concept for the practice of my method.

Fig. 2 is a view partly in cross section on the line X—X, of Fig. 1.

Fig. 3 is a view partly in cross section on the line Y—Y, of Fig. 1.

Fig. 4 is a side elevation of the apparatus indicated and further illustrating my method of producing and packing, and Fig. 5 is a view partly in cross section on the line Z—Z, of Fig. 1.

In the drawings I have attempted to indicate with a minimum of detail, a machine adapted for use where the available floor space is limited, but the machine is adaptable to floor space requirement to solve factory problems successfully.

My machine consists of a conveyor system including belts 1 running on rollers 2 journalled in any suitable frame 3 supported on legs 4 at convenient height for the operators who are usually seated at stations along the way.

The machine comprises three sections or zones, as indicated by the brackets in Fig. 1. The zone A is primarily the dipping and collecting zone. The cooling zone C is provided for the hardening of the coatings, and the delivery is made at the zone B.

Detachably mounted within the frame 3 are the coating pots 5. The frame includes dividing walls 6 for each belt upon which the dipping plates or palettes 7 are placed. The dividing walls 6 also support the trays 8 for the centers.

Each operator in the zone A has a different type of a center. Each center is dipped and then placed on the belt 1. As the belt moves by each station, the operator adds the type of candy which she is dipping. The candy placed on the belt 1 is shown by the shaded circles 9. Thus each longitudinal row or column of chocolates will be uniform.

The belts 1 carry the dipped centers through the cooling tunnel 10, as is shown in Fig. 3. The cooling unit 11 is standard and includes an air intake 12, a refrigerant inlet 13, an electric blower 14, and an air exhaust 15 upturned to avoid the direct contact of the cooled air on the operators. After the dipped centers have passed through the zone C, they are sufficiently hardened to permit packing.

The packing or boxing is done in the zone B. In this zone my machine is provided with a pair of conveyor belts 20 and 20a (see Figs. 1 and 5) for the boxes 21 adjacent and parallel to the belts 1. A guide rail 22 and rollers 23 are provided so that the boxes 21 will be moved across the belt 1 to the box conveying belt 24 which moves in the opposite direction. A bridge 25 with a guide rail 26 is provided to carry the boxes 21 across the other belt 1 to the belt 20a. The movement of the boxes 21 across the rollers 23 and the bridge 25 is caused by pressure from succeeding boxes on the moving belts.

As the boxes 21 are placed on the belt 20 the operators in the zone B each pick up a predetermined number of a certain type of dipped centers 9. As most boxes have two layers of candy, a convenient and practical method is to have a complete layer packed in during this stage and a suitable covering, such as is shown at 27, placed thereon so that when the boxes 21 reach the belt 20a, they will be ready for a repetition of the process just described whereby the box is filled. An operator stands at the end of the belt 20a and places covers on the boxes 21.

The boxes 21 are then placed on the conveyors 30 which may be mounted and driven to suit factory requirements and conditions. The conveyor 30 carries the boxes 21 back towards the zone C and deposits the boxes 21 on a slide 31. The boxes 21 are then picked up by operators in the zone C where they may be wrapped and handled in any way desired to facilitate economical production.

As before explained, the apparatus shown may be variously modified to practice my method of packing as herein indicated. The double form of the device in which there are parallel stations and conveyors is of great practical advantage in making possible a wide range of variety in the type of centers used without undue length to the apparatus. Where desired the apparatus might be made single with the number of stations in accordance with the requirements of the pack. Under other conditions the number of stations and conveyors combining to feed a common packaging station may be readily effected along the lines indicated.

It will be seen from the foregoing that I have provided by my method a novel basis for producing packs of assorted units with a maximum of assurance of the mixture desired for the pack. The direct packing of the fresh dipped centers coming from the cooler is also of very great advantage inasmuch as they are immediately placed in their ultimate container usually in a paper cup or holder, and are thus protected from damage such as might and usually would result from extended handling and re-handling of the units in trays before packaging.

All such variants and modifications as are above indicated are to be understood as in the concept of my invention, the same being readily understood and capable of practice by those skilled in this art.

What I therefore claim and desire to secure by Letters Patent is:

1. The method of packaging a predetermined mixture of candies of different kinds which consists in assembling each kind of candy in a row and in suitably spacing said rows in relatively parallel longitudinal formation, in continuously progressing the assembly in such series of rows to a series of packing stations, in removing successively one kind of a candy from its row as it progresses past each station, and in successively packing each piece of candy removed from its row in a box, and in moving the box to each successive station until the predetermined mixture content of the box is completed.

2. The method of packaging a predetermined mixture of candies of different kinds which consists in assembling each kind of candy in a row, in assembling the rows in relative parallel formation in continuously progressing the assembly to a series of packing stations, in removing successively a piece of one kind of a candy from its row as it progresses past each station, and in successively packing each piece of candy removed from its row in a box, and in moving the box to each successive station until the predetermined mixture content of the box is completed.

3. The method of packaging a predetermined mixture of candies of different kinds which consists in assembling each kind of candy in a longitudinal row, in assembling a plurality of such rows in continuously progressing the assembly in such series of rows to a series of packing stations, in removing successively a piece of one kind of a candy from its row as it progresses past each station, and in successively packing each piece of candy removed from its row in a box, and in moving the box to each successive station until the predetermined mixture content of the box is completed.

4. The method of packaging a predetermined mixture of candies of different kinds which consists in progressing a plurality of rows each composed of candies of one kind to a series of packing stations, in removing successively one kind of a candy from its row as it progresses past each station, and in successively packing the piece of candy removed from its row in a box, in moving the box to each successive station and in removing from its row and placing in said box a different kind of candy at each station until the predetermined mixture content of the box is completed.

5. The method of packaging a predetermined mixture of candies of different kinds which consists in ararnging each kind of candy in a row, in assembling the rows in predetermined order in progressing said assembly to a series of packing stations, in removing successively one kind of a candy from its row as it progresses past each station, and in successively packing the piece of candy removed from its row in a box, in continuously moving the box at the same speed as the candy to each successive station and in removing from its row and placing in said box a different kind of candy at each station until the predetermined mixture content of the box is completed.

6. The method of packaging a predetermined mixture of candies of different kinds in a two layer package, which consists in arranging each kind of candy in a longitudinal row in assembling said rows in relatively parallel formation in a pair of columns in progressing said columns to a pair of successive series of packing stations, in removing successively one kind of candy from its row as it progresses past each successive station, and in packing each piece of candy removed from its row in a box, and in moving the box with the candy to each successive station in each of the pairs of packing stations until the predetermined mixture content of the box is completed.

7. The method of packaging a predetermined mixture of fresh dipped candies of different kinds in a two layer package, which consists in arranging each kind of candy in a longitudinal row, in positioning said rows in a pair of spaced columns in progressing the columns to a pair of spaced successive series of packing stations, in removing successively one kind of a candy from its row as it progreses past each station, in packing each piece of candy removed from its row in a box, and in continuously moving the box with the candy to each successive station in each of the pairs of packing stations until the predetermined mixture content of the box is completed.

8. The method of packaging a predetermined mixture of candies of different kinds, which consists in continuously moving a pair of endless conveyors between and past a pair of rows of longitudinally separated loading stations and between and past a pair of rows of longitudinally separated removing stations, in first successively placing in a row on each conveyor as it passes each loading station in the row of loading stations immediately adjacent thereto a certain kind of candy, in assembling the rows in parallel formation on the conveyor, in thereafter successively removing one kind of candy from its row on each conveyor as it passes each removing station in the row of removing stations immediately adjacent thereto, in continuously and automatically moving a plurality of packages in a longitudinal direction past all of the removing stations in one row of removing stations, thence across the end of said row, thence between said row and the companion row of removing stations, thence across the end of said companion row and finally longitudinally past all of the removing stations in said companion row, and in placing the candies successively removed at the several removing stations of both rows of removing stations in the order of their removal at said removing stations into the packages traveling past said removing stations.

9. The method of packaging a predetermined mixture of candies of different kinds, which consists in continuously moving an endless conveyor past a series of longitudinally separated loading stations and past a series of longitudinally separated removing stations, in first successively placing each kind of candy in one of a predetermined plurality of relatively parallel rows on said conveyor as it passes each loading station in the series of loading stations, in thereafter successively removing one kind of candy from each row on said conveyor as it passes each removing station, in continuously and automatically moving a plurality of packages past all of the removing stations, and in placing the candies successively removed at the several removing stations in the order of their removal at said removing stations into the packages traveling past said removing stations.

10. The method of packaging mixtures of candies of different kinds which consists in assembling each kind of candies in a row, in assembling the rows in predetermined order, in continuously progressing the assembly in series through a series of packing stations, in removing successively one kind of a candy from its row as it progresses past each station, in packing the piece of candy removed from its row at each station in a box and in continuously moving the box to each successive station where one candy of different kind is removed from its row and placed in said box until the predetermined mixture content of the box is completed.

11. The method of packaging mixtures of candies of different kinds which consists in assembling each different kind of candy in one of a plurality of rows, in continuously conveying the assembly through a series of packing stations, in removing successively from its row one kind of a candy at each station, in placing the same in a box and in continuously moving the box at the same speed as the candy to each successive station where one candy of different kind is removed from its row and placed in said box until the predetermined mixture content of the box is completed.

12. The method of packaging mixtures of candies of different kinds which consists in continuously assembling each kind of candy in a row, in assembling the rows in relative longitudinal parallel position, in continuously conveying the assembly of rows through a series of packing stations, in removing successively one kind of a candy from its row at each station, in placing the same in a box and in continuously moving the box at the same speed as the assembled candy to each successive station where one candy of different kind is removed from its row and placed in said box until the predetermined mixture content of the box is completed.

13. The method of packaging mixtures of candies of different kinds which consists in assembling each kind of candy in a longitudinal row and in arranging the rows in parallel formation, in continuously conveying the assembly in series through a series of packing stations, in removing successively from its row one candy at each station, in placing the same in a box and in moving the box to each successive station where one candy of different kind is removed from said assembly and placed in said box until the predetermined mixture content of the box is completed.

14. The method of packaging mixtures of candies of different kinds which consists in assembling a plurality of parallel longitudinal rows, each row being composed of candies of one kind, in progressing the rows through a series of packing stations, in progressing a box simultaneously with the candy through said stations, and at each of said stations removing one candy from a predetermined row, and in placing the same in said box until the predetermined mixture content of the box is completed.

15. The method of packaging mixtures of candies of different kinds which consists in assembling a plurality of parallel longitudinal rows, each row being composed of candies of one kind, in progressing the rows through a series of packing stations, and at each of said stations removing one candy from a predetermined row for packaging.

GEO. C. MILLER.